US012254352B2

(12) United States Patent
Ramamurthy et al.

(10) Patent No.: US 12,254,352 B2
(45) Date of Patent: Mar. 18, 2025

(54) REDUCED MEMORY UTILIZATION FOR DATA ANALYTICS PROCEDURES

(71) Applicant: ServiceNow, Inc., Santa Clara, CA (US)

(72) Inventors: Vignesh Salem Ramamurthy, Hyderabad (IN); Gayatri Kamarajugadda, Hyderabad (IN); Lav Jaitak, Hyderabad (IN); Vamshi Sandhireddy, Hyderabad (IN); Kyle Barron-Kraus, East Lansing, MI (US); Aiswarya, Hyderabad (IN); Radhika Khandelwal, Hyderabad (IN); Rahul Borkar, Hyderabad (IN); Abhijith Nagarajan, Hyderabad (IN); Benedetto Fiorelli, Amsterdam (NL); Aravind Racharla, Hyderabad (IN)

(73) Assignee: ServiceNow, Inc., Santa Clara, CA (US)

(*) Notice: Subject to any disclaimer, the term of this patent is extended or adjusted under 35 U.S.C. 154(b) by 734 days.

(21) Appl. No.: 17/513,028

(22) Filed: Oct. 28, 2021

(65) Prior Publication Data
US 2023/0140179 A1 May 4, 2023

(51) Int. Cl.
G06F 9/50 (2006.01)
(52) U.S. Cl.
CPC .................. G06F 9/5016 (2013.01)
(58) Field of Classification Search
None
See application file for complete search history.

(56) References Cited

U.S. PATENT DOCUMENTS 4,941,084 A 7/1990 Terada et al.
5,185,860 A 2/1993 Wu
(Continued)

FOREIGN PATENT DOCUMENTS

EP 0433979 6/1991
EP 1607824 12/2005
(Continued)

OTHER PUBLICATIONS

"Rome Now Intelligence," ServiceNow, Oct. 4, 2021.
(Continued)

Primary Examiner — Wynuel S Aquino
(74) Attorney, Agent, or Firm — MCDONNELL BOEHNEN HULBERT & BERGHOFF LLP

(57) ABSTRACT

An example embodiment may involve a main database; a main memory; and one or more processors configured to: retrieve, by a data collector application, records from the main database, wherein the data collector application includes an embedded database; aggregate, by the data collector application, values in the records relating to a key performance indicator (KPI) to form partial KPI data stored in one or more blocks of the main memory; determine, by the data collector application, that utilization of the main memory exceeds a pre-defined threshold; in response to the utilization of the main memory exceeding the pre-defined threshold, write, by the data collector application, the partial KPI data to a row of the embedded database; and release, by the data collector application, the one or more blocks of the main memory used to store the partial KPI data.

20 Claims, 10 Drawing Sheets

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 11,675,767 B1* | 6/2023 | Behm ............... G06F 16/244 707/747 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2016/0142352 A1* | 5/2016 | Skudlark ............. H04L 63/1408 709/206 |
| 2018/0123940 A1 | 5/2018 | Rimar et al. |
| 2018/0253467 A1* | 9/2018 | Gurajada ............. G06F 11/1471 |
| 2019/0104398 A1 | 4/2019 | Owen et al. |
| 2020/0050689 A1 | 2/2020 | Tal et al. |
| 2020/0204443 A1 | 6/2020 | Bar Oz et al. |
| 2021/0194764 A1 | 6/2021 | Badyan et al. |
| 2022/0004480 A1* | 1/2022 | Fan ................ G06F 16/182 |
| 2022/0283875 A1* | 9/2022 | Ukawa ............... H04L 67/1001 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

"Embedded database," Wikipedia, https://en.wikipedia.org/wiki/Embedded_database, printed from the World Wide Web Oct. 10, 2021.

* cited by examiner

REDUCED MEMORY UTILIZATION FOR DATA ANALYTICS PROCEDURES

BACKGROUND

Performance analytics software applications can be used to mine databases of records and generate reports on key performance indicators (KPIs). In some cases, these reports may be visualized by way of dashboards that present interactive summaries of one or more KPIs. In order to aggregate KPI data from the raw records, data collector jobs may execute according to a defined schedule or on demand. But as database size and the number of KPIs of interest has grown, the amount of main memory and processing resources used by data collector jobs has become untenably large. As a result, data collector jobs in current systems can take many hours to execute, and might not complete at all. During their execution, these jobs can prevent other applications from obtaining main memory and processing resources needed for responsive execution.

SUMMARY

The embodiments herein overcome these and possibly other deficiencies by splitting data collector jobs into a number of stages and storing intermediate results in an embedded database when an indicator of main memory utilization crosses a threshold value. An intermediate result may be a partial calculation of a KPI that can be combined with further calculations of the KPI to produce a complete calculation of the KPI. Once an intermediate result is stored in this fashion, main memory used by the data collector job can be cleared and the next stage of the data collector job can be started. This repeats until all of the records of interest in the main database have been processed. When each new partial calculation is written to the embedded database, the data collector job may perform aggregation of all partial calculations so far to obtain a complete calculation of the KPI. Alternatively, the data collector job may perform aggregation of all partial calculations after all partial calculations have been written to the embedded database.

Limiting the main memory utilization in this fashion has been experimentally shown to dramatically reduce the runtime of data collector jobs (possibly due to less thrashing of virtual memory, among other reasons). Further, some data collector jobs that had not been able to complete using conventional techniques will complete when these embodiments are employed. As a consequence, the embodiments herein produce the desired results more rapidly, more reliably, and with less impact on other applications.

Accordingly, a first example embodiment may involve a main database; a main memory; and one or more processors configured to: retrieve, by a data collector application, records from the main database, wherein the data collector application includes an embedded database; aggregate, by the data collector application, values in the records relating to a KPI to form partial KPI data stored in one or more blocks of the main memory; determine, by the data collector application, that utilization of the main memory exceeds a pre-defined threshold; in response to the utilization of the main memory exceeding the pre-defined threshold, write, by the data collector application, the partial KPI data to a row of the embedded database; and release, by the data collector application, the one or more blocks of the main memory used to store the partial KPI data.

A second example embodiment may involve retrieving, by a data collector application, records from a main database, wherein the data collector application includes an embedded database. The second example embodiment may involve aggregating, by the data collector application, values in the records relating to a KPI to form partial KPI data stored in one or more blocks of a main memory. The second example embodiment may involve determining, by the data collector application, that utilization of the main memory exceeds a pre-defined threshold. The second example embodiment may involve, possibly in response to the utilization of the main memory exceeding the pre-defined threshold, writing, by the data collector application, the partial KPI data to a row of the embedded database. The second example embodiment may involve releasing, by the data collector application, the one or more blocks of the main memory used to store the partial KPI data.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
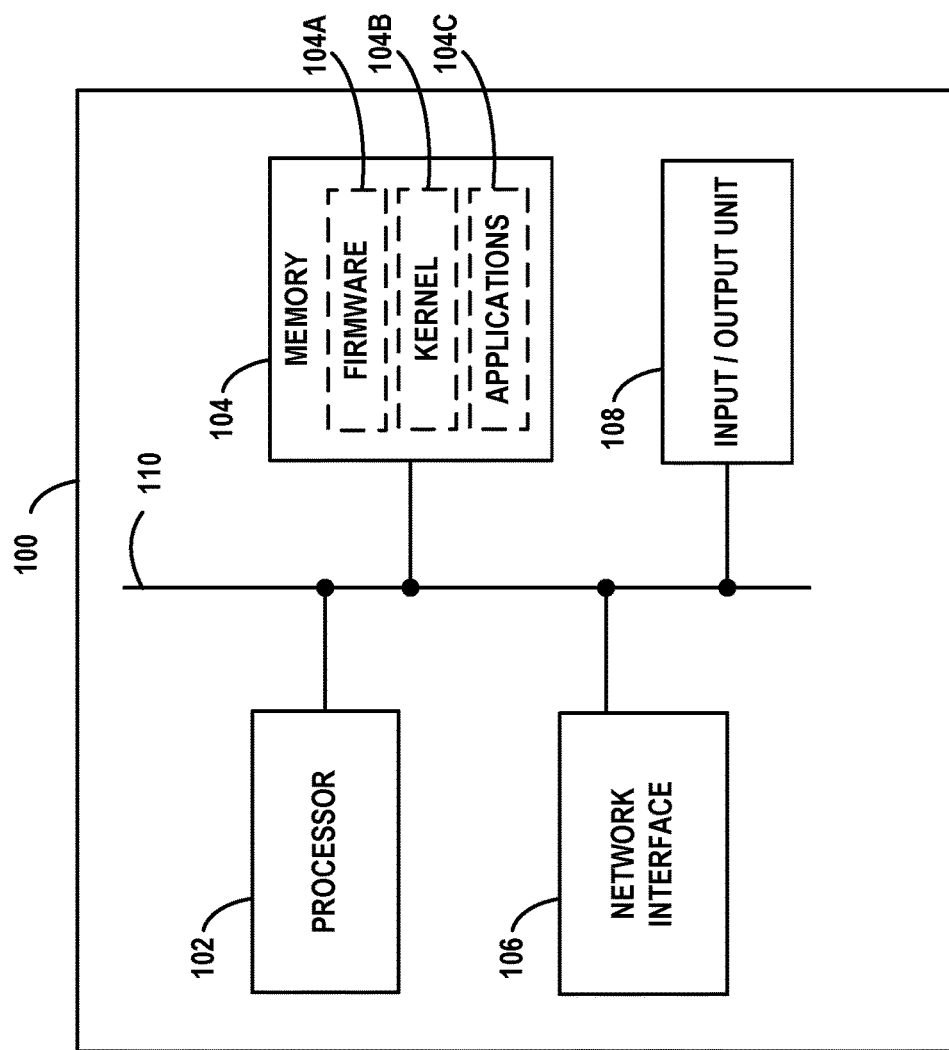
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
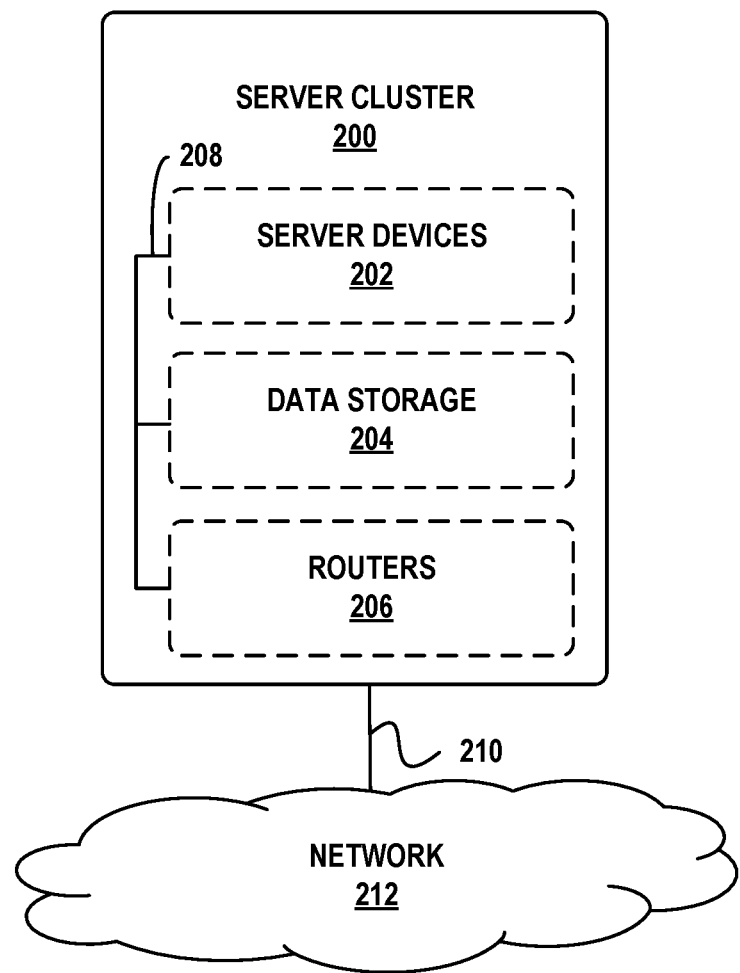
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
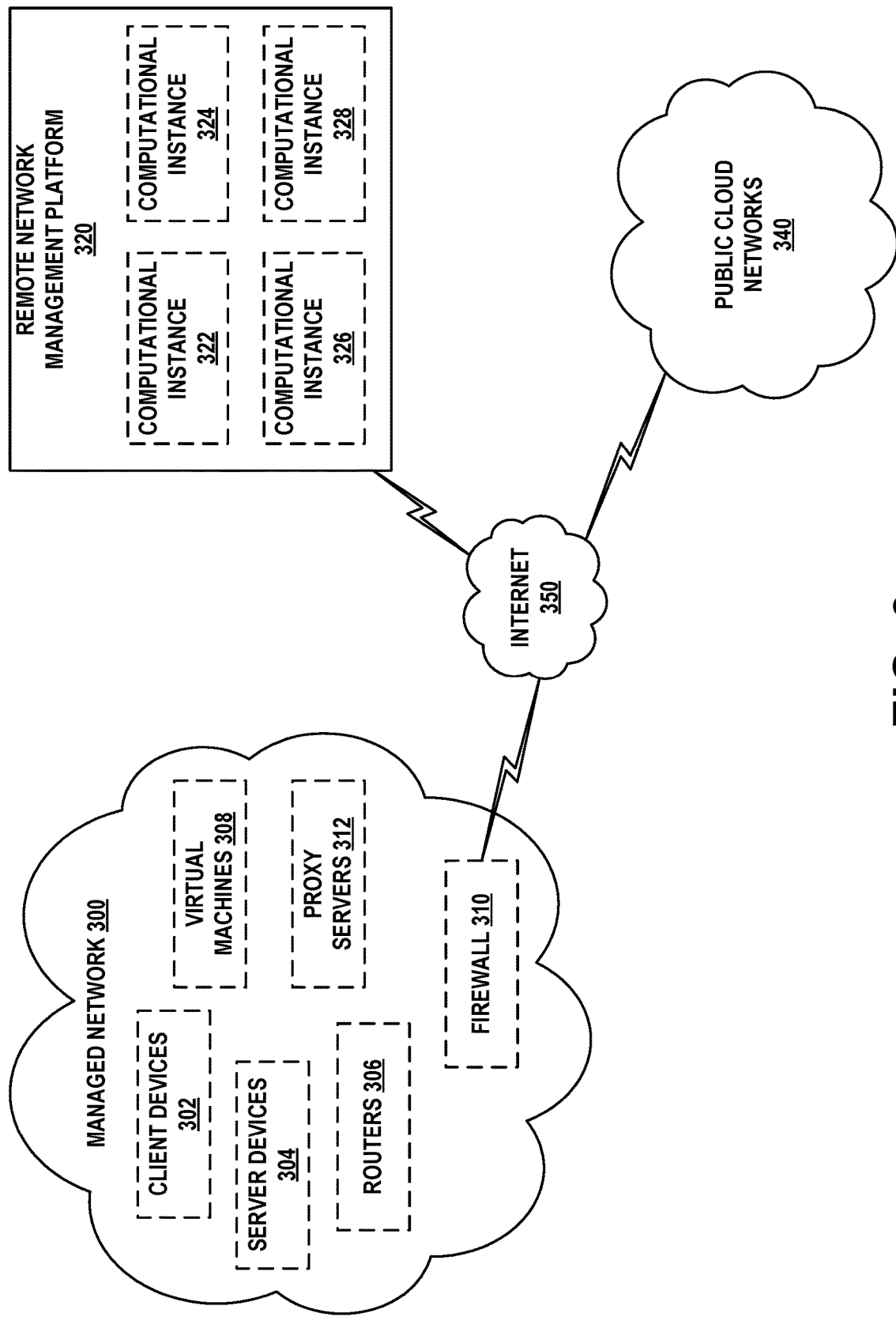
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
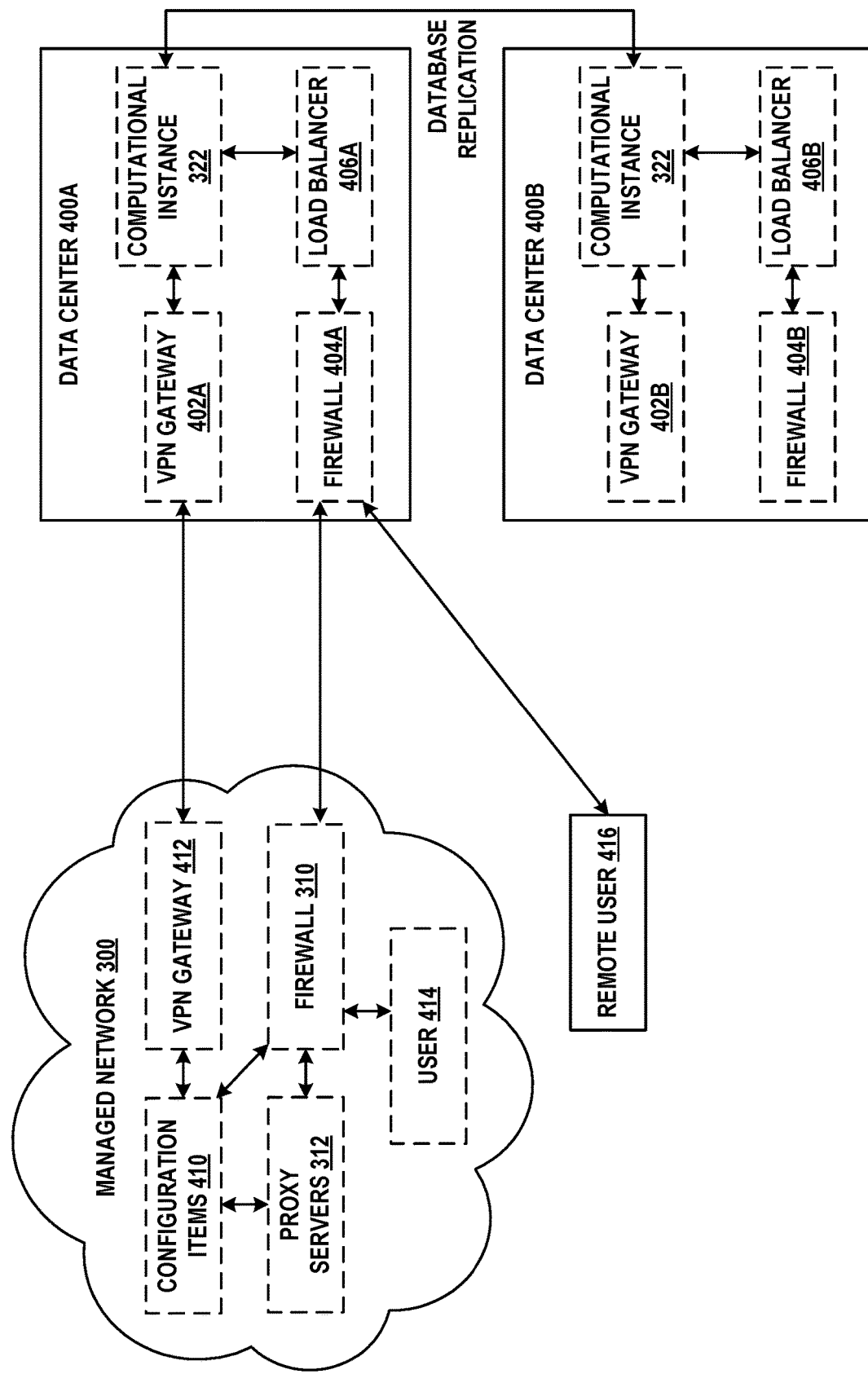
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
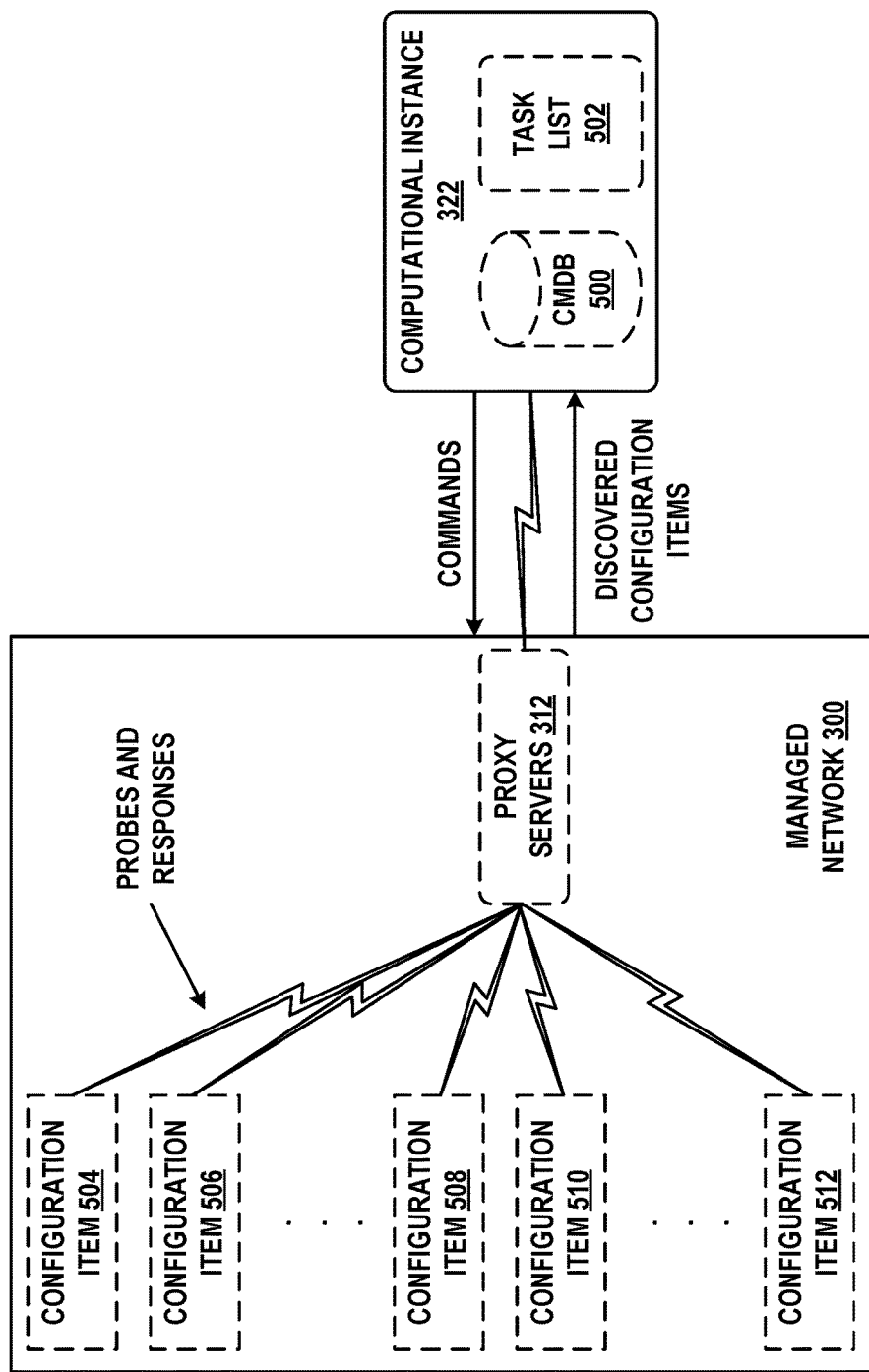
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
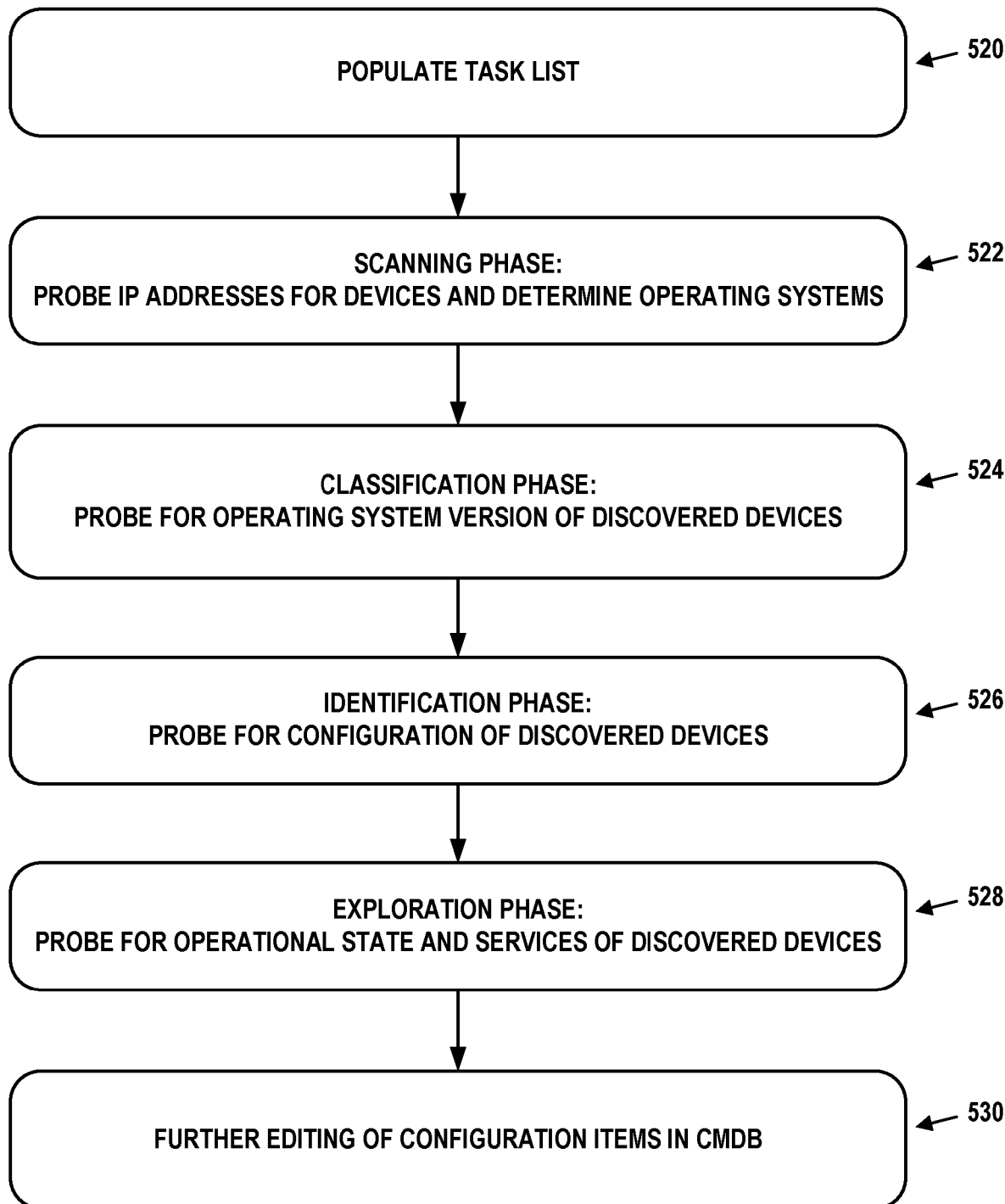
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. KPI CALCULATION

KPIs are metrics of interest that can be derived from records in a database, such as a CMDB, an incident database, a security operations database, and so on. In some cases, KPIs can be derived from information in more than one database. Regardless of its content, the database from which raw records are obtained shall be referred to as a "main database" herein, in order to differentiate it from an embedded database that is used to store partial aggregations of these records during data collector job executions.

KPI calculations may entail identifying a particular metric by applying a filter to the records of the main database, and aggregating values of the metric as returned by the filter. Such an aggregation may involve summing, averaging, or applying some other operation or operations to the values. In order to illustrate KPI calculations a real-world example is provided.

An incident database may track problems experienced by technology users of an enterprise. Each record in an incident database may specify: a unique incident identifier, an individual reporting the incident, a time when the incident was opened, a time when the incident was closed, the state of the incident (e.g., new, in progress, on hold, resolved, cancelled, closed), the geographic region of the individual (e.g., North America, South America, EMEA, APAC), the department of the individual (e.g., engineering, sales, marketing, finance, HR, legal), the IT group to which the incident was assigned (e.g., tier 1, tier 2, VIP), category, (e.g., email, Wifi, VPN, hardware, software), severity (e.g., critical, major, minor), priority (high, medium, low), and so on.

Users of an incident tracking system may be interested in KPIs that are any possible combinations of these incident properties. For example, a possible KPI could be the number of incidents opened in North America, from the engineering department, assigned to the tier 1 IT group, in the email category, with a critical severity, and with a high priority. Another KPI might be the average time to closure (i.e., the time when the incident was opened subtracted from the time when the incident was closed), for incidents opened in EMEA, from the sales department, assigned to the tier 2 IT group, with a critical severity, and with a high priority. Each of these KPIs can be specified by way of a filter, which then can be applied to the records of the incident database.

Just considering the incident fields of state, geographic region, department, IT group, category, severity, and priority, a total of 19,440 KPIs are possible, Further, if KPIs can be specified where the contents of some fields are "don't care" (e.g., any value of that field will be considered), then 94,080 KPIs are possible.

But the extent of KPIs can be even greater. Some KPIs may be aggregated over one or more periods of time (e.g., per day, per week, per month), and thus there may be one value of the KPI for each of these time periods. Additionally, some KPIs may be associated with a list of incident identifiers so that the specific incident records that contributed to the KPI can be readily obtained. Such a list will grow as more records are aggregated into the KPI. All of this results in the number of KPIs growing combinatorically with the permutations of the field values and periods of time, with each KPI being associated with a list that grows linearly.

In uses other than incident management, such as security operations, each device in a network (e.g., each client device, server device, router, switch, etc.) may be associated with multiple KPIs (e.g., security vulnerabilities identified on the device). Given that large enterprises can support tens of thousands of devices, the total number of KPIs can reach the millions.

Further, calculation of each KPI can be customized by way of a script or programmatic code. Thus, KPI collection and aggregation may vary between platforms and this customization can require additional main memory and processor resources for data collector jobs.

Modern main databases might have between 10 million and 100 million records (or more) that can be mined for KPI data. Thus, queries made to such a database for a specific KPI may take minutes to complete, as the main database may be stored on low-speed non-volatile storage (e.g., a hard drive) and each record might need to be checked against a filter that defines the KPI and then have one or more of its fields aggregated into the KPI. This is an unacceptably lengthy wait for a human user.

To avoid this latency, one or more data collector jobs may be configured to execute on a regular basis (e.g., once per day). Such a data collector job may read a chunk of one or more records from the main database, and then aggregate data from these records into partial KPI calculations held in main memory (e.g., RAM). The data collector job continues to read chunks from the main database and perform this aggregation until all chunks have been processed. Put another way, the data collector job executes over one or more tables of records in the main database, classifying each record into zero more KPI categories, and aggregating data in the record per category.

The resulting KPIs (and their associated record identifiers, if applicable) are then written to one or more performance analytics tables of the main database or to one or more performance analytics tables of a separate database. Then, when a KPI is requested by a user, the KPI can be read from the performance analytics tables in a single query that is likely to take a few seconds or less. Further, the user may be presented with the KPI (e.g., on a dashboard of a graphical user interface) in such a way that the user can also request views of related KPIs or the records associated with a particular KPI.

Figure 6:
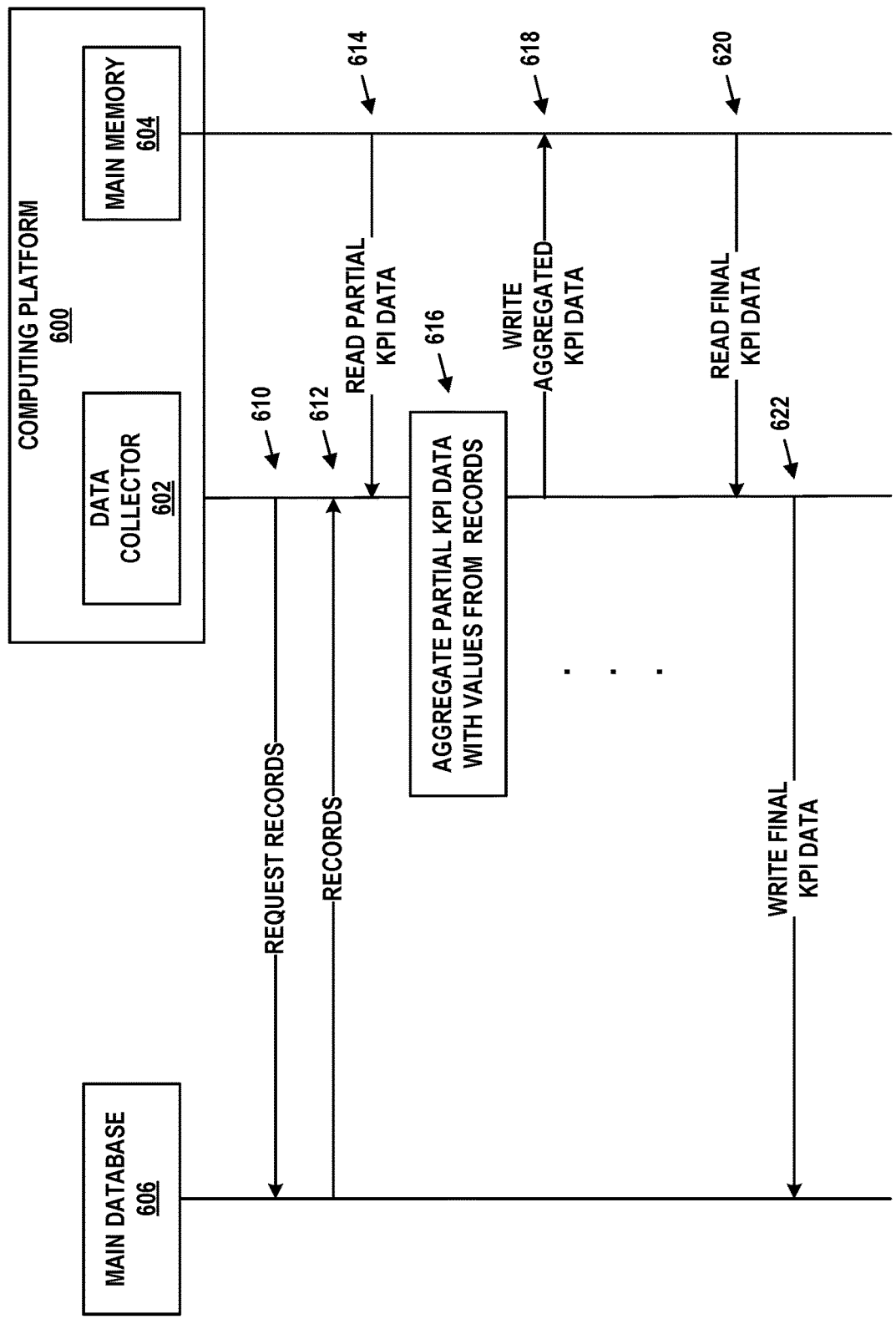
FIG. 6 depicts a ladder diagram, in accordance with example embodiments.

Such a process is shown in FIG. 6. Computing platform 600 includes data collector application 602 and main memory 604. Data collector application 602 is in communication with main database 606.

At step 610, data collector application 602 requests a chunk of records related to one or more KPIs of interest from main database 606. At step 612, main database 606 provides these records to data collector application 602.

At step 614, data collector application 602 retrieves, from main memory 604, any partial KPI data already calculated for these KPIs of interest (in some cases, this partial KPI data may be referred to as "partial KPI scores" or "partial KPIs", for example). Step 614 may be skipped if steps 610 and 612 are the first request related to these KPIs, and thus there is no partial KPI data.

At step 616, data collector application 602 aggregates the partial KPI data with values from the records. This may involve summing, averaging, or carrying out other operations on the partial KPI data and the values. At step 618, data collector application 602 writes, to main memory 604, the aggregated KPI data as an update to the partial KPI data.

As indicated by the ellipsis, steps 610-618 may repeat some number of times until all relevant records have been retrieved and their values aggregated into the partial KPI data in main memory 604.

At step 620, after all relevant records have been processed in this fashion, data collector application 602 may retrieve the final (fully aggregated) KPI data from main memory 604. At step 622, data collector application 602 may write this final KPI data to performance analytics tables of main database 606. Alternatively, the final KPI data could be written to performance analytics tables of a different database.

After step 622, the final KPI data for these KPIs of interest can be deleted from main memory 604. In this fashion, steps 610-622 may be carried out for multiple KPIs at same time.

Advantageously, such pre-calculating of KPIs results in user queries for KPIs being answerable within an acceptable response time. Nonetheless, such pre-calculation has its costs. Each KPI of interest needs to be pre-calculated in order for a performance analytics to be of use. Given the vast number of possible KPIs of interest, data collector jobs often use massive amounts of main memory. It is not uncommon for such jobs to use between 1 and 1.5 gigabytes of main memory during execution. A commensurate portion of processor resources may also be used in order to carry out the main database accesses and aggregation of tens of thousands of KPIs.

As a consequence, data collector jobs can take an unacceptably long time to execute, if they complete at all, and starve other applications on the same computing platform from using a sufficient amount of main memory and processing resources. This can cause the entire platform and all applications executing on it to slow down, halt, crash, or the platform itself to become unstable or crash (e.g., due to thrashing of virtual memory). Further, as it is desirable to update some KPIs on a daily basis, the data collector jobs should be able to complete overnight so that updated KPIs are available the next morning. But since some data collector jobs can take 14 hours or more, this goal is not always possible to achieve.

A naïve approach to addressing this problem would be to add more memory to the computing platform so that the amount used by data collector jobs can be more easily accommodated. However, there are several practical reasons that such a method would be cumbersome or just not work. First, the computing platform may be deployed within data centers across multiple geographic locations (see FIG. 4). Thus, all platforms in all data centers would have to be upgraded. Second, upgrading main memory beyond 4 gigabytes would not make a difference for applications (such as the data collector) operating on a 32-bit JAVA® virtual machine (JVM), and would require a much more complicated upgrade to a 64-bit JVM. Third, even with more memory, the magnitude of data involved in data collector jobs can still grow effectively unbounded.

VI. IMPROVED KPI CALCULATION WITH AN EMBEDDED DATABASE

Given the drawbacks of current KPI pre-calculation techniques, the embodiments herein aim to decrease the instantaneous main memory utilization of data collector jobs by temporarily offloading partial KPI data to an embedded database in non-volatile storage (e.g., disk). Notably, an embedded database is integrated with a specific application and typically not a standalone entity. This essentially hides some of the details of the database from the user, and does not require separate installation and configuration of the database by a system administrator—instead, the embedded database is installed and configured as part of the application. Often, embedded databases are simpler in design than traditional databases, with fewer capabilities and thus require less overhead in terms of storage and processing power. Examples of embedded databases include H2, HSQLDB, Apache Derby, Berkeley DB, and SQLite.

A data collector job's utilization of main memory is monitored, either directly or indirectly (e.g., by way of KPI counts). When this utilization reaches a specific threshold, the partial KPI data is written to the embedded database and main memory previously used to store the partial KPI data (e.g., one or more blocks of this memory) is released. Thus, the amount of main memory used for a data collector job at any given moment can be limited.

When the data collector job has read all relevant records from the main database, the last update to the embedded database results in the final KPI data being ready. The final KPI data is then written to one or more performance analytics tables of the main database or to one or more performance analytics tables of a separate database. Then the records in the embedded database that hold the KPI data can be released.

One of the advantages of using an embedded database rather than the main database for storage of partial KPI data is that the partial KPI data can be stored without modifying the schema of the main database. Further, the embedded database can be disposed upon a different non-volatile storage device (e.g., a different hard disk drive, solid state drive, or network attached storage) than the main database. In this manner, such a non-volatile storage device will not be a bottleneck for both main database and embedded database functions.

Limiting the utilization of main memory can occur in a number of ways. In some embodiments, this may involve a data collector job periodically monitoring its main memory utilization (e.g., once per minute by way of system call). When this utilization reaches a pre-defined threshold (e.g., 300-400 megabytes, but values from a broader range could be used), writing of the partial KPI data from main memory to the embedded database can be triggered.

Alternatively or additionally, other thresholds may be used that are first-order approximations of actual main memory utilization. For instance, thresholds can be defined for the maximum number of KPIs stored in the partial KPI data (e.g., 50,000, 100,000, or 200,000) and/or the maximum number of records (e.g., 500,000, 1,000,000, or 2,000,000) that contribute to the KPIs of the partial KPI data (recall that in some cases, the unique identifiers are stored also with the KPI data). If either of these thresholds is reached, writing of the partial KPI data from main memory to the embedded database can be triggered.

Other possibilities exist. For instance, linear combinations of the above thresholds could be used to define combined thresholds.

The partial KPI results written to the embedded database may use a table schema as shown in Table 1. Each row in this database would represent a partial KPI result for a single KPI.

The sys_domain column specifies an optional domain. Such domains may be used to separate KPI data per domain when multiple domains (e.g., customers) are supported on the same computational instance.

The combination of the indicator, breakdown, element, breakdown_l2, and element_l2 columns specify a unique identifier of the KPI. These columns refer to columns of the main database record that are used to define the KPI. For example, in the case of the incident database discussed above, these columns in the embedded database may refer to the state, priority, and severity columns of the main database (or some other combination of columns of the main database).

TABLE 1

| Column | Type |
| --- | --- |
| sys_domain | varchar(32) |
| indicator | int(11) |
| breakdown | int(11) |
| element | varchar(32) |
| breakdown_l2 | int(11) |
| element_l2 | varchar(32) |
| count | int(11) |
| agg_value | decimal(18, 7) |
| cd_first | decimal(18, 7) |
| cd_last | decimal(18, 7) |
| distint_values | mediumtext |

The count column maintains count of records that have contributed to the partial KPI result, and the agg_value columns maintains the aggregated value of this result. Thus, for example, partial KPI data for the average time that an incident has been open over a subset of incidents would include the number of these incidents in the count column and a sum or running average of the times these incidents have been open in the agg_value column.

The cd_first and cd_last columns keep track of distinct record identifiers for the first and last records that contributed to the partial KPI.

Each data collector job may write one row to such a partial KPI table each time the job offloads partial KPI data from the main memory to the embedded database. Thus, in some embodiments, a final aggregation step may involve aggregating the partial KPI data over these rows and then writing the results to one or more performance analytics tables of the main database or to one or more performance analytics tables of a separate database. Alternatively, each offload of partial KPI data from the main memory to the embedded database may update the values in a single row. In this latter embodiment, each KPI would have exactly one row in the embedded database.

Figure 7A:
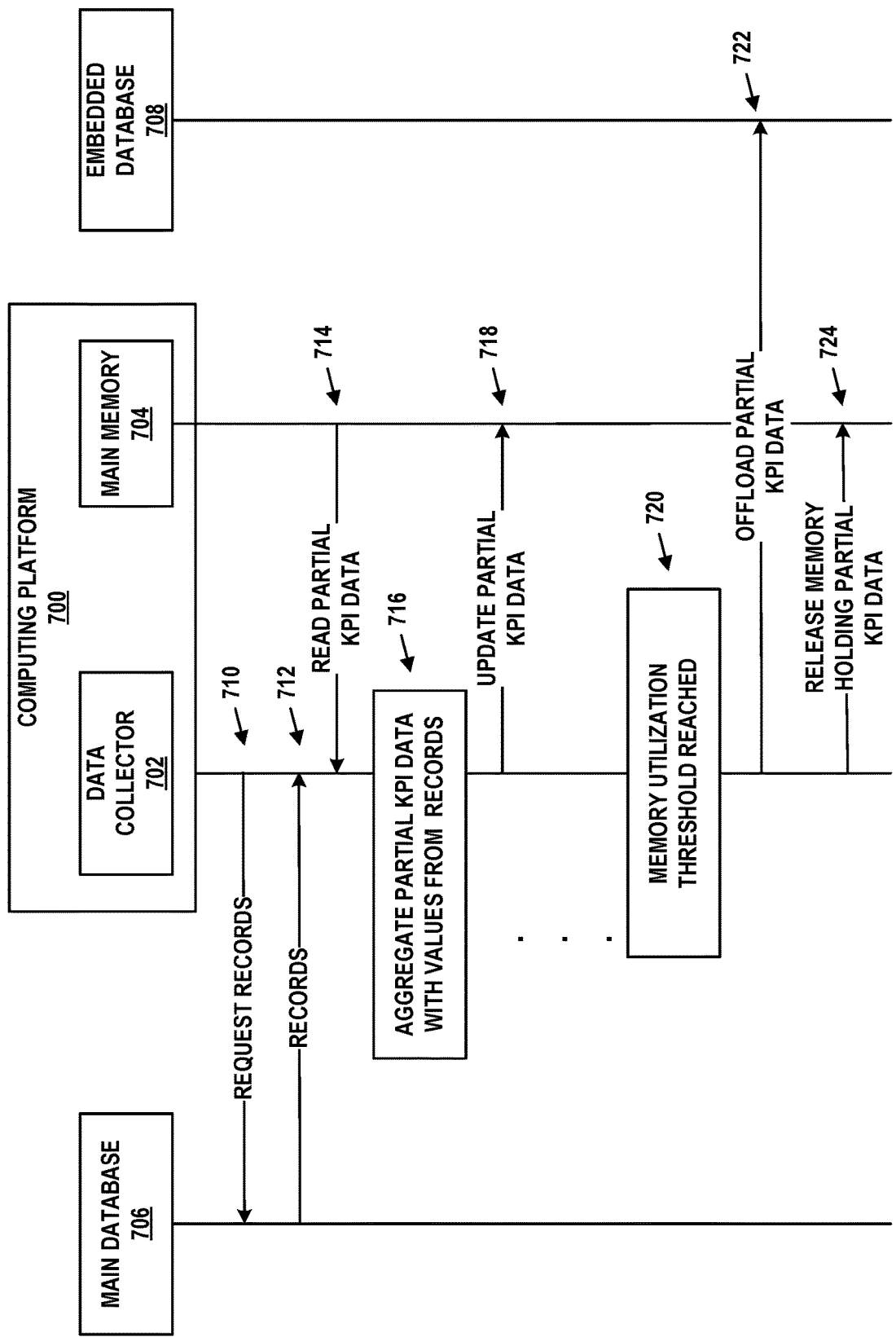
FIGS. 7A and 7B depict another ladder diagram, in accordance with example embodiments.
Figure 7B:
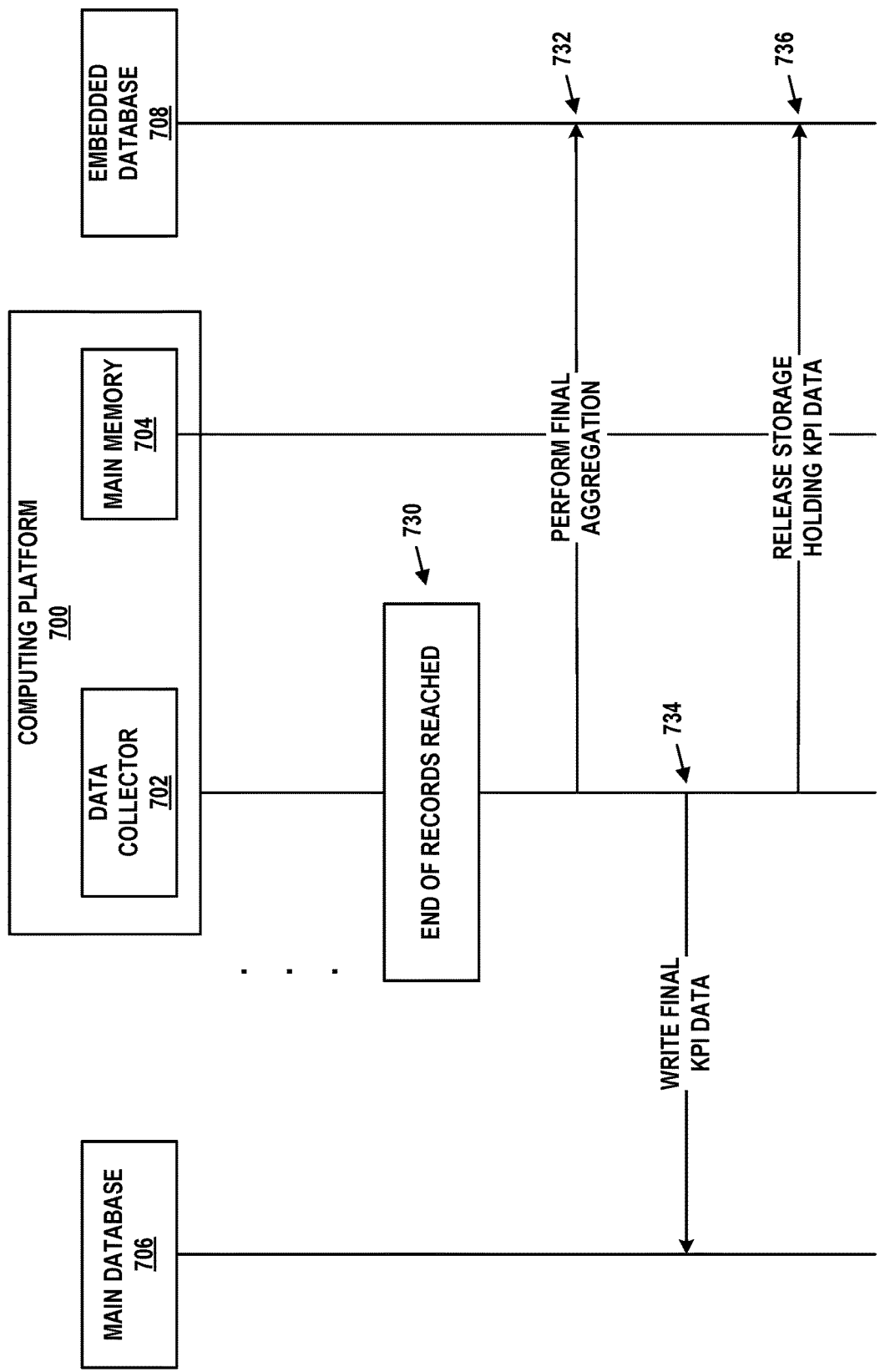

FIGS. 7A and 7B illustrate this process. Computing platform 700 includes data collector application 702 and main memory 704. Data collector application 702 is in communication with main database 706 and embedded database 708. As noted, embedded database 708 may integrated with data collector application 702 but store its data in non-volatile storage rather than main memory.

At step 710, data collector application 702 requests a chunk of records related to one or more KPIs of interest from main database 706. At step 712, main database 706 provides these records to data collector application 702.

At step 714, data collector application 702 retrieves, from main memory 704, any partial KPI data already calculated for the KPIs of interest. Step 714 may be skipped if steps 710 and 712 are the first request related to these KPIs, and thus there is no partial KPI data.

At step 716, data collector application 702 aggregates the partial KPI data with values from the records. This may involve summing, averaging, or carrying out other operations on the partial KPI data and the values. At step 718, data collector application 702 writes, to main memory 604, the aggregated KPI data as an update to the partial KPI data.

As indicated by the ellipsis, steps 710-718 may repeat some number of times until all multiple chunks of records have been retrieved and their values aggregated into the partial KPI data in main memory 704.

At step 720, data collector application 702 may determine that a memory utilization threshold has been reached for main memory 704. As indicated above, this may involve a direct probe of the amount of main memory 704 that data collector application 702 is using, or a first-order approximation based on some indication of the usage of main memory 704 (e.g., the number of KPIs and/or records processed by data collector application 702 that are currently stored in main memory 704).

At step 722, in response to determining that the memory utilization threshold has been reached, data collector application 702 may offload the partial KPI data from main memory 704 to a partial KPI table structure in embedded database 708. In some cases, this may involve merging and consolidating the partial KPI data with previously-stored partial KPI data in a form of rolling aggregation. At step 724, data collector application 702 may release memory in main memory 704 that is holding the offloaded partial KPI data. In this manner, the amount of main memory 704 used by data collector application 702 is constrained to a configurable amount.

Turning to FIG. 7B, steps 710-724 may repeat some number of times as indicated by the ellipsis. Eventually, at step 730, data collector application 702 determines that the end of the records being read from main database 706 has been reached.

At step 732, possibly in response to making this determination, data collector application 702 may perform a final aggregation on the partial KPI data in embedded database 708. As indicated, this final aggregation may involve, for the KPI being processed, aggregating partial KPI data stored across multiple rows of a partial KPI table. Alternatively, if each KPI is aggregated on a running basis in a single row, step 732 could be omitted.

At step 734, data collector application 702 may write the final KPI data to main database 706 (or an alternative database). At step 736, data collector application 702 may release storage in embedded database 708 that holds the KPI data. Thus, the amount of storage used in embedded database 708 is constrained to be the amount needed for KPI calculations, and this memory is cleared when the KPI calculations for one or more given KPIs are completed.

VII. PERFORMANCE RESULTS

Experiments comparing the embodiments of FIGS. 7A and 7B with those of FIG. 6 have been conducted, and these experiments establish that the former has a number of advantages over the latter. For all of these experiments, memory utilization that triggered an offload of partial KPI data to the embedded database is 100.000 KPIs or 1.000.000 records.

TABLE 2

| # Records Processed | # KPIs Generated | Runtime | | Disk Usage | |
|---|---|---|---|---|---|
| | | Previous | New | Previous | New |
| 500K | 761K | 1 hr 10 min | 8 min | N/A | 226 MB |
| 2M | 1.2M | 2 hr 13 min | 22 min | N/A | 306 MB |
| 5M | 1.4M | 2 hr 57 min | 1 hr 35 min | N/A | 306 MB |
| 10M | 1.4M | 3 hr 39 min | 2 hr 41 min | N/A | 306 MB |
| 28M | 1.4M | DID NOT COMPLETE | 3 hr 57 min | N/A | 306 MB |
| 28M | 7M | DID NOT COMPLETE | 13 hr 29 min | N/A | 1861 MB |

The first set of results is shown in Table 2. In this table, results for varying numbers of incident records (i.e., incident records in the main database) and numbers of KPIs are shown. The traditional technique utilizing only main memory ("Previous") is compared to the new technique of FIGS. 7A and 7B in terms of runtime and disk usage.

In all cases, the runtime of the new technique outperforms that of the traditional technique. Notably, the two largest data collector jobs did not complete when the traditional technique was applied (e.g., caused application or system failure), whereas these jobs did complete when the new technique was applied.

Also, while the new technique requires disk (non-volatile memory) storage during operation, the overall amount of this storage is not excessive. Further, since disk storage is inexpensive and plentiful, this temporarily utilization is a small price to pay for dramatically reduced main memory utilization and runtime.

TABLE 3

| # Records Processed | # KPIs Generated | Runtime | | Disk Usage | |
|---|---|---|---|---|---|
| | | Previous | New | Previous | New |
| 2M | 138K | 1 hr 57 min | 59 min | N/A | 1378 MB |
| 10M | 170K | 10 hr 13 min | 2 hr 35 min | N/A | 2885 MB |
| 15M | 215K | 13 hr 23 min | 5 hr 39 min | N/A | 8005 MB |
| 20M (6 Indicators) | 215K | 23 hr 44 min | 7 hr 50 min | N/A | 10565 MB |
| 20M (2 Indicators) | 205K | DID NOT COMPLETE | 2 hr | N/A | 414 MB |

The second set of results is shown in Table 3. Here, results for varying numbers of security operations records (i.e., security operations records in the main database) and numbers of KPIs are shown. The traditional technique utilizing only main memory ("Previous") is compared to the new technique of FIGS. 7A and 7B in terms of runtime and disk usage.

Again, the runtime of the new technique outperforms that of the traditional technique. The largest data collector job did not complete when the traditional technique was applied (e.g., caused application or system failure), whereas this did complete when the new technique was applied.

Also, the new technique did require a fair amount of disk storage during operation (up to 10.5 gigabytes for the most data-intensive job). However, as of the time of this writing multi-terabyte disks have become standard in most devices. Thus, this temporarily utilization is also a small price to pay for dramatically reduced main memory utilization and runtime.

Overall, the performance of a computing platform with the improvement described herein is improved by 30-50% in terms of data collector runtime, while having an acceptable impact on non-volatile memory (disk) utilization.

VIII. EXAMPLE OPERATIONS

Figure 8:
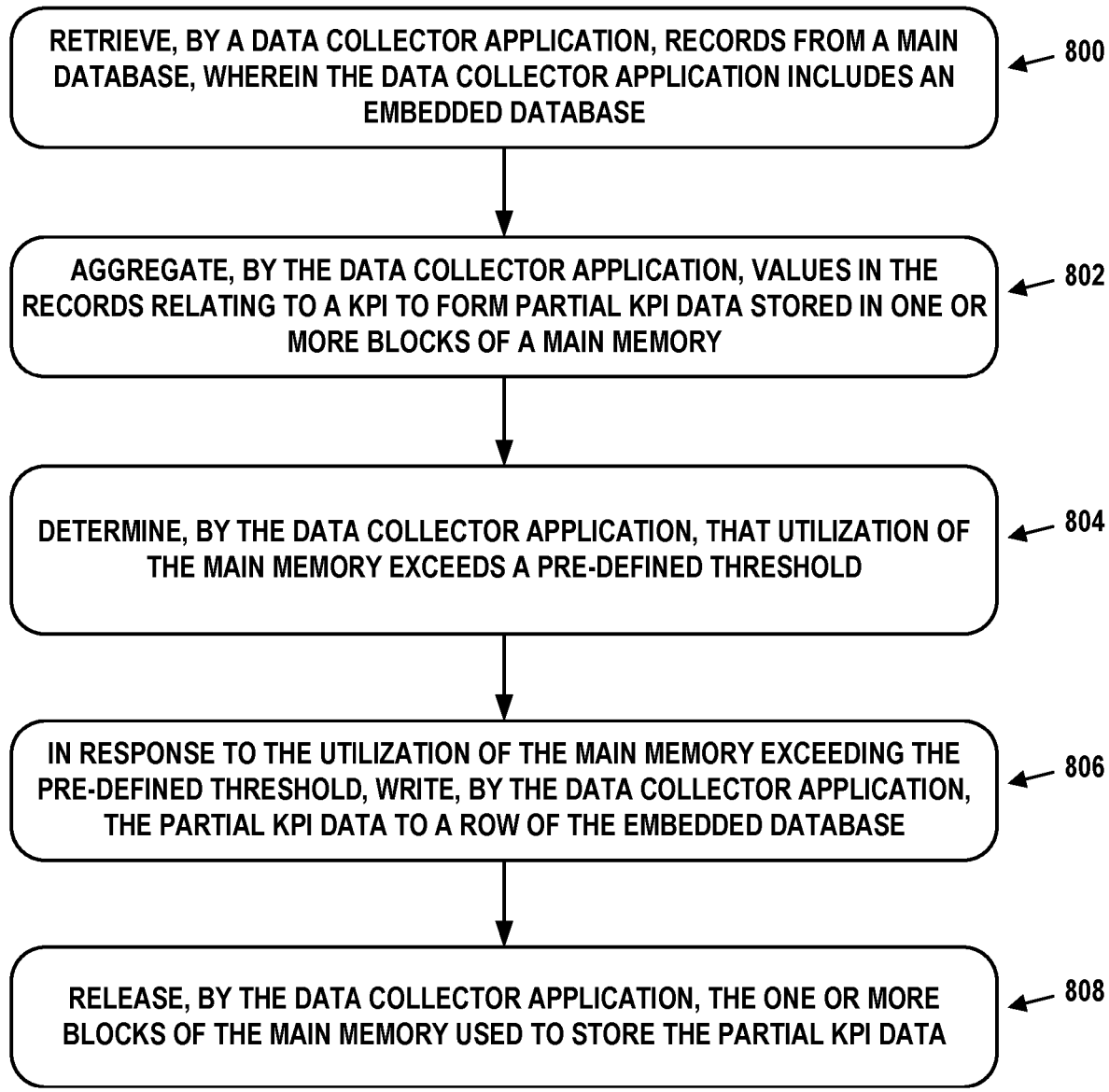
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve retrieving, by a data collector application, records from a main database, wherein the data collector application includes an embedded database.

Block 802 may involve aggregating, by the data collector application, values in the records relating to a KPI to form partial KPI data stored in one or more blocks of a main memory.

Block 804 may involve determining, by the data collector application, that utilization of the main memory exceeds a pre-defined threshold.

Block 806 may involve, possibly in response to the utilization of the main memory exceeding the pre-defined threshold, writing, by the data collector application, the partial KPI data to a row of the embedded database.

Block 808 may involve releasing, by the data collector application, the one or more blocks of the main memory used to store the partial KPI data.

In some embodiments, the main database and the embedded database use non-volatile storage, and the main memory is volatile storage. In some embodiments, the non-volatile storage includes a hard disk drive or a solid state drive, and the volatile storage is RAM.

In some embodiments, writing the partial KPI data to the row of the embedded database comprises writing the partial KPI data to a new row of the embedded database. These embodiments may further involve: determining that an end of the records has been reached; possibly in response to determining that the end of the records has been reached, aggregating values in all rows of the embedded database relating to the KPI to form final KPI data; writing the final KPI data to the main database; and deleting the rows of the embedded database relating to the KPI.

In some embodiments, writing the partial KPI data to the row of the embedded database comprises combining the partial KPI data with other partial KPI data already stored in the row of the embedded database. These embodiments may further involve: determining that an end of the records has been reached; possibly in response to determining that the end of the records has been reached, writing values from the row of the embedded database to the main database as final KPI data; and deleting the row of the embedded database relating to the KPI.

In some embodiments, determining that the utilization of the main memory exceeds the pre-defined threshold comprises determining that the data collector application is using more than a pre-defined amount of the main memory.

In some embodiments, the partial KPI data is related to a plurality of KPIs, and determining that the utilization of the main memory exceeds the pre-defined threshold comprises determining that a number of KPIs represented in the partial KPI data exceeds a pre-defined amount.

In some embodiments, determining that the utilization of the main memory exceeds the pre-defined threshold comprises determining that a number of the records used to form the partial KPI data exceeds a pre-defined amount.

Some embodiments may involve: retrieving further records from the main database; aggregating further values in the further records relating to the KPI to form further partial KPI data stored in one or more further blocks of the main memory; determining that further utilization of the main memory exceeds the pre-defined threshold; possibly in response to the further utilization of the main memory exceeding the pre-defined threshold, aggregating the further partial KPI data with the partial KPI data in the row of the embedded database; and releasing the one or more further blocks of the main memory used to store the further partial KPI data.

Some embodiments may involve: aggregating the values in the records relating to a further KPI to form further partial KPI data stored in one or more further blocks of the main memory; possibly in response to the utilization of the main memory exceeding the pre-defined threshold, writing the further partial KPI data to a further row of the embedded database; and releasing the one or more further blocks of the main memory used to store the further partial KPI data.

In some embodiments, aggregating the values in the records relating to the KPI to form partial KPI data comprises summing or averaging the values.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a main database;
a main memory; and
one or more processors configured to:
retrieve, by a data collector application, records from the main database into the main memory, wherein the data collector application includes an embedded database, wherein the embedded database is separate from the main database, wherein the main memory is volatile storage, wherein the embedded database is in non-volatile storage;
aggregate, by the data collector application, values in the records relating to a key performance indicator (KPI) to form partial KPI data stored in one or more blocks of the main memory;
determine, by the data collector application, that utilization of the main memory exceeds a pre-defined threshold;
in response to the utilization of the main memory exceeding the pre-defined threshold, write, by the data collector application, the partial KPI data to a row of the embedded database, wherein writing the partial KPI data to the row of the embedded database comprises combining the partial KPI data with other partial KPI data already stored in the row of the embedded database;
determine that an end of the records has been reached;
in response to determining that the end of the records has been reached, write values from the row of the embedded database to the main database as final KPI data;
delete the row of the embedded database relating to the KPI; and
release, by the data collector application, the one or more blocks of the main memory used to store the partial KPI data.

2. The system of claim 1, wherein the non-volatile storage includes a hard disk drive or a solid state drive, and wherein the volatile storage is random access memory (RAM).

3. The system of claim 1, wherein determining that the utilization of the main memory exceeds the pre-defined threshold comprises determining that the data collector application is using more than a pre-defined amount of the main memory.

4. The system of claim 1, wherein the partial KPI data is related to a plurality of KPIs, and wherein determining that the utilization of the main memory exceeds the pre-defined threshold comprises determining that a number of KPIs represented in the partial KPI data exceeds a pre-defined amount.

5. The system of claim 1, wherein determining that the utilization of the main memory exceeds the pre-defined threshold comprises determining that a number of the records used to form the partial KPI data exceeds a pre-defined amount.

6. The system of claim 1, wherein the one or more processors are further configured to:
retrieve further records from the main database;
aggregate further values in the further records relating to the KPI to form further partial KPI data stored in one or more further blocks of the main memory;
determine that further utilization of the main memory exceeds the pre-defined threshold;
in response to the further utilization of the main memory exceeding the pre- defined threshold, aggregate the further partial KPI data with the partial KPI data in the row of the embedded database; and
release, by the data collector application, the one or more further blocks of the main memory used to store the further partial KPI data.

7. The system of claim 1, wherein the one or more processors are further configured to:
aggregate the values in the records relating to a further KPI to form further partial KPI data stored in one or more further blocks of the main memory;
in response to the utilization of the main memory exceeding the pre-defined threshold, write the further partial KPI data to a further row of the embedded database; and
release the one or more further blocks of the main memory used to store the further partial KPI data.

8. The system of claim 1, wherein aggregating the values in the records relating to the KPI to form partial KPI data comprises summing or averaging the values.

9. A computer-implemented method comprising:
retrieving, by a data collector application, records from a main database into a main memory, wherein the data collector application includes an embedded database, wherein the embedded database is separate from the main database, wherein the main memory is volatile storage, wherein the embedded database is in non-volatile storage;
aggregating, by the data collector application, values in the records relating to a key performance indicator (KPI) to form partial KPI data stored in one or more blocks of the main memory;
determining, by the data collector application, that utilization of the main memory exceeds a pre-defined threshold;
in response to the utilization of the main memory exceeding the pre-defined threshold, writing, by the data collector application, the partial KPI data to a row of the embedded database, wherein writing the partial KPI data to the row of the embedded database comprises combining the partial KPI data with other partial KPI data already stored in the row of the embedded database;
determining that an end of the records has been reached;
in response to determining that the end of the records has been reached, writing values from the row of the embedded database to the main database as final KPI data;
deleting the row of the embedded database relating to the KPI; and
releasing, by the data collector application, the one or more blocks of the main memory used to store the partial KPI data.

10. The computer-implemented method of claim 9, wherein determining that the utilization of the main memory exceeds the pre-defined threshold comprises determining that the data collector application is using more than a pre-defined amount of the main memory.

11. The computer-implemented method of claim 9, wherein the partial KPI data is related to a plurality of KPIs, and wherein determining that the utilization of the main memory exceeds the pre-defined threshold comprises determining that a number of KPIs represented in the partial KPI data exceeds a pre-defined amount.

12. The computer-implemented method of claim 9, wherein determining that the utilization of the main memory exceeds the pre-defined threshold comprises determining that a number of the records used to form the partial KPI data exceeds a pre-defined amount.

13. The computer-implemented method of claim 9, further comprising:
retrieving further records from the main database;
aggregating further values in the further records relating to the KPI to form further partial KPI data stored in one or more further blocks of the main memory;
determining that further utilization of the main memory exceeds the pre-defined threshold;
in response to the further utilization of the main memory exceeding the pre- defined threshold, aggregating the further partial KPI data with the partial KPI data in the row of the embedded database; and
releasing, by the data collector application, the one or more further blocks of the main memory used to store the further partial KPI data.

14. The computer-implemented method of claim 9, further comprising:
aggregating the values in the records relating to a further KPI to form further partial KPI data stored in one or more further blocks of the main memory;
in response to the utilization of the main memory exceeding the pre-defined threshold, writing the further partial KPI data to a further row of the embedded database; and
releasing the one or more further blocks of the main memory used to store the further partial KPI data.

15. An article of manufacture including a non-transitory computer-readable medium, having stored thereon program instructions that, upon execution by a computing system, cause the computing system to perform operations comprising:
retrieving, by a data collector application, records from a main database into a main memory, wherein the data collector application includes an embedded database, wherein the embedded database is separate from the main database, wherein the main memory is volatile storage, wherein the embedded database is in non-volatile storage;
aggregating, by the data collector application, values in the records relating to a key performance indicator (KPI) to form partial KPI data stored in one or more blocks of the main memory;
determining, by the data collector application, that utilization of the main memory exceeds a pre-defined threshold;
in response to the utilization of the main memory exceeding the pre-defined threshold, writing, by the data collector application, the partial KPI data to a row of the embedded database, wherein writing the partial KPI data to the row of the embedded database comprises combining the partial KPI data with other partial KPI data already stored in the row of the embedded database;
determining that an end of the records has been reached;
in response to determining that the end of the records has been reached, writing values from the row of the embedded database to the main database as final KPI data;
deleting the row of the embedded database relating to the KP; and
releasing, by the data collector application, the one or more blocks of the main memory used to store the partial KPI data.

16. The article of manufacture of claim 15, wherein determining that the utilization of the main memory exceeds the pre-defined threshold comprises determining that the data collector application is using more than a pre-defined amount of the main memory.

17. The article of manufacture of claim 15, wherein the partial KPI data is related to a plurality of KPIs, and wherein determining that the utilization of the main memory exceeds the pre-defined threshold comprises determining that a number of KPIs represented in the partial KPI data exceeds a pre-defined amount.

18. The article of manufacture of claim 15, wherein determining that the utilization of the main memory exceeds the pre-defined threshold comprises determining that a number of the records used to form the partial KPI data exceeds a pre-defined amount.

19. The article of manufacture of claim 15, wherein the operations further comprise:
- retrieving further records from the main database;
- aggregating further values in the further records relating to the KPI to form further partial KPI data stored in one or more further blocks of the main memory;
- determining that further utilization of the main memory exceeds the pre-defined threshold;
- in response to the further utilization of the main memory exceeding the pre- defined threshold, aggregating the further partial KPI data with the partial KPI data in the row of the embedded database; and
- releasing, by the data collector application, the one or more further blocks of the main memory used to store the further partial KPI data.

20. The article of manufacture of claim 15, wherein the operations further comprise:
- aggregating the values in the records relating to a further KPI to form further partial KPI data stored in one or more further blocks of the main memory;
- in response to the utilization of the main memory exceeding the pre-defined threshold, writing the further partial KPI data to a further row of the embedded database; and
- releasing the one or more further blocks of the main memory used to store the further partial KPI data.

* * * * *